United States Patent [19]
Piroska

[11] 3,962,950
[45] June 15, 1976

[54] BOLT PRETENSIONING DEVICE

[75] Inventor: Jozsef Piroska, Jarfalla, Sweden

[73] Assignee: Eric Rummelhoff, Vallingby, Sweden

[22] Filed: Jan. 25, 1974

[21] Appl. No.: 433,567

[52] U.S. Cl. ............................................. 85/32 R
[51] Int. Cl.² ....................................... F16B 37/00
[58] Field of Search ................... 85/32 R, 32 T, 1 T, 85/33

[56] References Cited
UNITED STATES PATENTS

| | | | |
|---|---|---|---|
| 1,475,907 | 11/1923 | Volman | 85/33 |
| 2,571,265 | 10/1951 | Leufven | 85/32 R |

FOREIGN PATENTS OR APPLICATIONS

| | | | |
|---|---|---|---|
| 1,299,259 | 7/1969 | Germany | 85/32 R |
| 1,014,479 | 12/1965 | United Kingdom | |
| 908,360 | 10/1962 | United Kingdom | 85/32 R |

Primary Examiner—Ramon S. Britts
Attorney, Agent, or Firm—Hill, Gross, Simpson, Van Santen, Steadman, Chiara & Simpson

[57] ABSTRACT

An annular piston has a bore threaded to a bolt end and is disposed between a base and a nut in axially spaced relation to the nut, there being an annular cylinder slidably receiving and surrounding the piston and defining an annular pressure chamber therewith, the cylinder being disposed between the base and the nut so that the nut can be tightened to act axially through the cylinder against the base in the absence of any pressure in the chamber. With pressure present in the chamber of a magnitude which tensions the bolt, after pre-tension has been overcome, the nut is free to be rotated to a desired setting.

3 Claims, 4 Drawing Figures

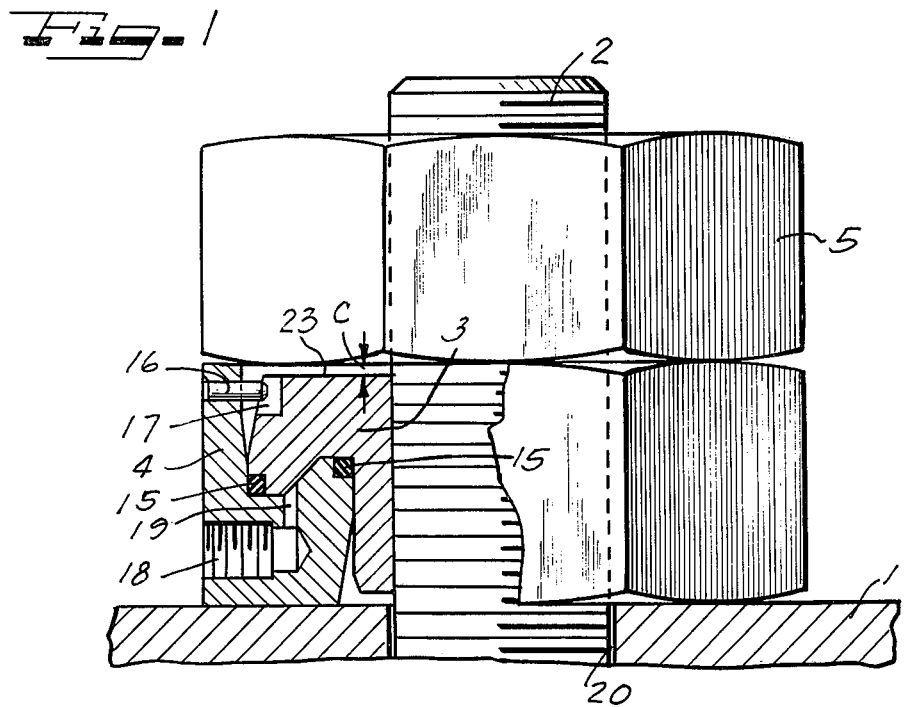
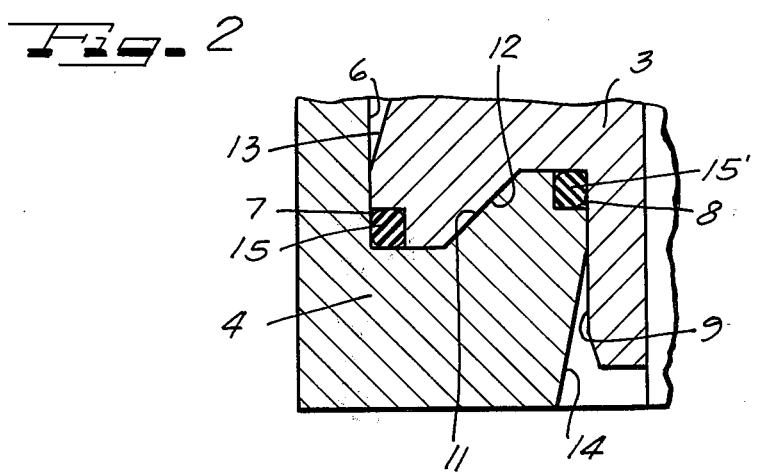

BOLT PRETENSIONING DEVICE

BACKGROUND OF THE INVENTION

1. Field of the Invention

This invention relates to a device for fluidly tensioning a bolt to enable its nut to be tightened or loosened.

2. Prior Art

Heavily axially loaded bolts are usually axially pre-tensioned so that the threaded joint under load will normally keep the structural sections thereby bound together in an unaltered position without any further elongation of the bolts. It is not usually possible to carry out pre-tensioning or pre-stressing of bolts just by tightening of a nut, due to the uncertainty of accomplishing the desired pre-tension with sufficient accuracy in this way. For example, too large a torque may be applied to a long bolt, or there can be difficulty in general in attempting to apply the necessary torque to the nut. In certain constructions having a number of such bolts, there is the requirement that the pre-tension in each bolt is to be accurately controlled, and in many instances to be evenly distributed between the various bolts. The latter requirement is prescribed, for example, for bolts in rolling mills, larger diesel engines, reactor vessels and pressure pipe lines.

There are known devices for pre-tensioning screwed bolts with the help of hydraulically operated pistons. In one form of such device, the device is removed after the bolt is tensioned and needs to be reattached for releasing the nut. Such device has the disadvantage of large dimensions and comparatively high weight. In that it must be moved from one connection to the next for each tightening procedure, it must be handled using special suspending devices because of its weight. Such device is therefore difficult to maneuver, slow in use, and cannot be used to advantage when several bolts are to be tightened simultaneously.

Another device uses an auxiliary nut and likewise the auxiliary device for tensioning the bolt must be applied to the bolt which is to be tensioned and must be removed afterwards.

A further known device has the disadvantage that the load in the finally tensioned bolt is transferred through two threaded joints, a prerequisite of the device being accurate guidance of a piston along two pairs of cylindrical cooperating guide surfaces. Further, this device does not compensate for the effect of axial deviations in the direction of the bolt in relation to the seat when pressure has been released. A screwed bolt which from the beginning shows such an axial deviation tends while being elongated to be straightened in the direction of force, which happens under comparatively large contact pressure between force transmitting surfaces. It may also be that the bolt will be subjected to bending. Due to the construction of such device, release of the fastening nut in the conventional manner in a emergency, involves considerable difficulty.

SUMMARY OF THE INVENTION

According to this invention, a bolt tensioning device is provided which includes an annular piston that is threaded to the bolt and which is disposed between the nut and a base that the nut would ordinarily engage, the piston being axially spaced from the nut, and an annular cylinder receiving the piston and defining a pressure chamber therewith, the cylinder being disposed between the nut and the base and so sized that the nut acts axially through the cylinder against the base.

Accordingly, it is an object of the present invention to provide a fluid-actuated bolt tensioning device for use during tightening and loosening of a threaded nut carried on the threaded end of the bolt.

A further object of the present invention is to provide such a device which is of such negligible size that it may be used on or with adjacent bolts lying in proximity to one another.

A still further object of the present invention is to provide a device of the type described which does not need to be removed from the structure with which it is used.

Yet another object of the present invention is to provide a simple, lightweight device that can be readily handled.

A still further object of the present invention is to provide a device of the type described which is of such construction that a series of such devices can be simultaneously provided and operated where a series of bolts lie close to one another.

A still further object of the present invention is to provide a device of the type described which allows for and which adapts to possible angular misalignment.

Many other advantages, features and additional objects of the present invention will become manifest to those versed in the art upon making a reference to the detailed description and the accompanying drawings in which a preferred structural embodiment incorporating the principles of the present invention is shown by way of illustrative example.

ON THE DRAWINGS

FIG. 1 is a vertical side elevational view, partly in cross section, of a pretensioning device provided in accordance with the present invention;

FIG. 2 is an enlarged fragmentary portion of FIG. 1;

AS SHOWN ON THE DRAWINGS

Figure 3:
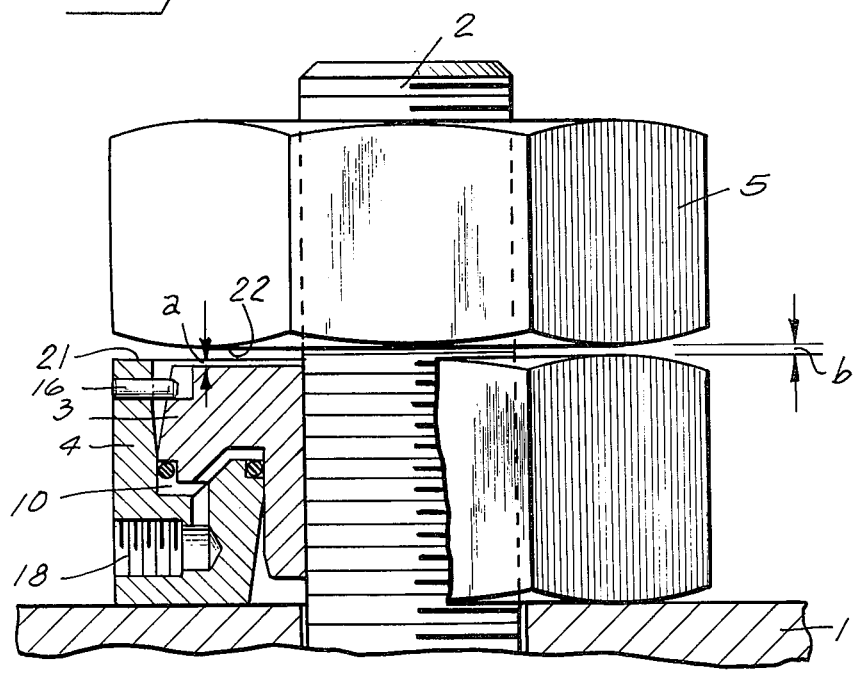
FIG. 3 is a view corresponding to FIG. 1, showing the device with the bolt in an elongated or tensioned position, before the nut has been tightened.

The principles of the present invention are particularly useful when embodied in a bolt pre-tensioning device or combination embodying such device such as illustrated in FIG. 1. A threaded bolt 2 extends through an opening 20 in a rigid base 1. On the bolt 2, a piston 3 is screwed, the piston being engaged by a cylinder 4 resting against the base 1. The cylinder 4 has an inner cylindrical surface 6 (FIG. 2) coaxial with the axis of the bolt. A circular edge of a recess 7 in the piston 3 coacts with this surface 6, in such recess 7 there being an annular seal or O-ring 15 for axially slidably sealing against the cylinder surface 6. From the end of the surface 6, a circular wall portion 11 extends radially inwardly, terminating in a second sealing recess 8 in which is a second seal or O-ring 15'. A cylinder surface 9 on the piston 3 coacts axially slidably with an edge of the sealing recess 8 and the seal ring 15'. Abutting the wall portion 11, the piston 3 has a circular wall portion 12, extending from the cylinder surface 9 to the sealing recess 7. The sealing recesses 7 and 8 with their seals 15 and 15' are situated in a plane substantially at right angles to the axis of the bolt. The circular wall portions 11 and 12 are in part frustoconical to facilitate placing the seals in their recesses opposite each other. From the edge of the recess 7 a frustoconical piston surface 13 extends at an angle towards the axis of the cylinder. Similarly, an inner frustoconical surface 14 of the cylinder 4 extends at an angle outwardly from the axis of the bolt.

A fastening nut 5 is shown in FIG. 1 in a position of engagement with the upper end surface of the cylinder 4, and the piston 3 is in the bottom position in the cylinder 4, in which position the cylinder wall portion 11 is engaged by the corresponding wall portion 12 of the piston 3. The upper end surface 23 of the piston is spaced from the lower end surface of the nut 5, so that a gap $c$ is formed between these two surfaces. Angular keying is provided between the piston and the cylinder, and in this embodiment, the piston 3 is guided in the cylinder 4 by a pin 16, engaging in an axial groove 17. The keying enables the pretensioning device 3,4 to be positioned on the threads of the bolt without direct access to the piston 3.

In the position shown in FIG. 1, the nut 5 is only lightly tightened against the cylinder 4.

In order to elongate and pretension the bolt 2, a pressure medium is introduced between the piston 3 and the cylinder 4 through at least one inlet 18 and duct 19 in the cylinder 4. The piston 3 is thereby shifted to the position shown in FIG. 3, elongating the bolt 2, on which the piston 3 is threaded. The nut 5 being threaded onto the bolt 2, moves with the piston 3 and with the elongating movement of the bolt with the gap $c$ maintained, so that a gap $b$ is formed between the upper side 21 of the cylinder 4 and the lower side 22 of the nut 5. The width of the gap $b$ corresponds to the elongation of the bolt 2. As the width of the gap $c$ in the initial position is greater than the width of the gap $b$, the upper side 23 of the piston 3 does not come even or level with the upper side 21 of the cylinder 4, but is recessed therefrom by a distance $a$. In this position, the nut 5 is tightened lightly against the cylinder 4, so that the surfaces 21 and 22 come into engagement with comparatively little force against each other. This tightening can be done by hand or by a simple hand tool, spanner wrench or the like. An important feature of this invention is that no tension is being applied to the threads that carry the nut 5 during rotation of the nut 5, whereby drag in the fit between the threads of the nut 5 and the bolt 2 is avoided to a large extent.

Figure 4:
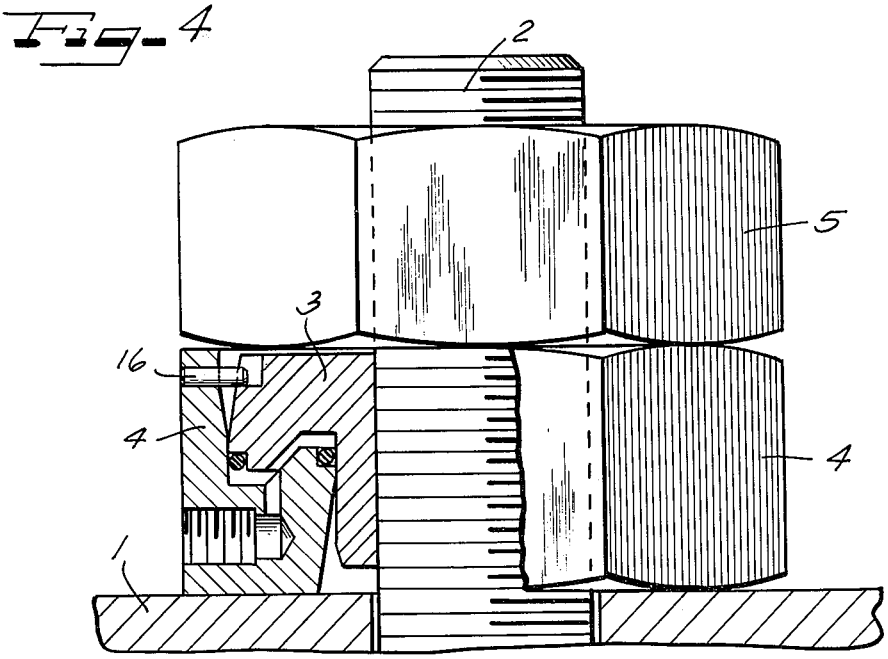
FIG. 4 is a corresponding view with the fastening nut in a tightened position.

In the tightened position, the nut 5 is in engagement with the cylinder 4 as shown in FIG. 4, the gap $a$ remaining between the nut 5 and the piston 3. In this position, an annular pressure chamber 10, bounded by the cylindrical surfaces 6,9, seals 15,15' and the wall portions 11,12, is unloaded from pressurized fluid. The tension from the bolt 2 will thereby be transmitted to the base 1 via the nut 5, and the cylinder 4. The piston 3 is completely unloaded from all axial force.

In the ideal case, all engaging surfaces have the correct geometrical form, the bolt axis extends exactly at right angles to the flat base, all bores are concentric with the axis of the bolt, the axial engagement surfaces of the parts are at right angles to the axis of the bolt, and other fitting faults do not arise. However, in practice certain possible angular deviations or misalignments between the coacting parts of the joint must be considered. Screwed bolts with comparatively large diameter involve transmission of large forces. Therefore, consideration must be given to the deviations of the type mentioned. On being elongated, the bolt tends to take up an axial position as near to the resulting line of force as is possible. It is then of importance that the tensioning device and the parts of the construction do not oppose this tendency of the bolt to adjust during the elongating operation itself. While being elongated, the bolt is exposed to axial loading most immediately from the piston 3 and is generally guided sideways by the piston 3. If for some reason the bolt 2 does not have its axis coaxial with the axis of the cylinder 4, due to the cylinder's being at an angle of inclination in relation to the bolt 2 when it is in contact with the base 1, this inclination will not directly affect the bolt 2 via the piston 3, since the piston 3 is able to take up a certain inclination in the cylinder 4 while maintaining unaltered axial slidability in the cylinder. This inclination of the piston in the cylinder is made possible because the sealing recesses 7,8 with the seals 15,15' lie essentially in the same plane and essentially at right angles to the axis of the bolt 2, a deviation from this plane thus not having any notable effect on the relative positions of the coacting cylinder surfaces and sealing edges. The cylinder and piston are normally manufactured with a radial clearance of about 0.2 mm between coacting surfaces and sealing edges. The angular deviations in question here are easily absorbed by this clearance without the coacting surfaces and edges binding against each other.

To allow the piston the possibility of taking up a somewhat inclined position without interference, the surfaces 13,14 leading to the sealing edges on the piston and cylinder respectively are made frustoconical so that a diverging gap is formed from the sealing edge between the cylindrical surface of the cylinder and piston respectively and the opposite conical surfaces. During the elongating operation, the piston can thereby be displaced in the cylinder, even in a somewhat inclined position, without affecting the guidance of the piston or its sealing against the cylinder. It is important that both the outer and the inner sealing recesses lie substantially in the same plane, thereby reducing to a minimum the relative radial displacement of the sealing edges on the inclination of the piston.

To compensate for a relative inclination between the nut 5 and the cylinder 4 and to ensure even contact between the surfaces 22,21, these surfaces are preferably of mutually suited convex form. Frustoconical surfaces can also be used, since the deviation from an ideal spherical form will be negligible. The nut 5 lies against the cylinder 4 in a position corresponding to the position which the bolt 2 automatically takes, through the elongated operation, there being thus no oblique loading of the bolt through the nut 5. Force transmission from the bolt takes place via a single threaded engagement through the cylinder 4 to the base 1, this factor allowing deformation caused by removing pressure from the pressure chamber 10 to be easily checked. Any deformation takes place in the threaded engagement between the nut 5 and the bolt 2 and in the engagement surfaces 21,22 and to a certain extent in the upper portion of the cylinder 4.

When the connection is to be released, a procedure reverse to that described above is used. Pressure medium is introduced through the inlet 18 into the pressure chamber 10, whereby the bolt is elongated and contact force from the nut 5 against the cylinder 4 is unloaded. Thereafter, the nut can easily be turned, after which pressure in the pressure chamber 10 is again released.

When it is necessary to unload or pretension all the bolts in a construction simultaneously, the pressure medium is applied to each bolt tensioning device from a common pressure fluid source. Every tensioning device may then be simultaneously loaded or unloaded.

The cylinder 4 and the nuts 5 of the invention preferably have spanner flats, so that the joint can be tightened or loosened with conventional tools. This feature is valuable if there has been damage to the pretensioning device, or to the force transmitting screwed joint. In the illustrated embodiment, the cylinder and nut are provided with octagonal flats which is representative of any suitable spanner grip.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A device for tensioning a bolt, having a threaded end projecting from a separate base, during tightening and loosening of a threaded nut carried on the threaded end of the bolt, comprising:
   a. an annular piston having a threaded bore for being carried in threaded engagement with said threaded bolt end between said base and said nut in axially spaced relation to said nut, the piston having a stepped external annular surface with a peripheral sealing edge, and the outermost larger diameter piston surface portion converging axially from said step; and
   b. an annular cylinder angularly keyed to and slidably receiving and surrounding said piston and defining an annular pressure chamber therewith, said cylinder being adapted to be disposed between and to engage said base and said nut and so sized that the nut can be tightened to act axially through said cylinder against the base, the cylinder having a stepped annular internal surface comprising a cylindrical larger diameter cylinder surface cooperating with said piston sealing edge and an inner peripheral sealing edge cooperating with a reduced diameter cylindrical surface portion of the piston, and a reduced diameter internal cylinder surface converging axially from the cylinder step, the said sealing edges disposed substantially in a radial plane of the cylinder so as to enable a slight tilting of the piston in the cylinder, and the said piston-cylinder forming a unit of the same outer configuration as the nut with the ends of the piston spaced axially inwardly of the cylinder end surfaces, said cylinder having fluid inlet means and including a duct extending between said fluid inlet means and said pressure chamber, said piston and said cylinder having sealing means disposed between mating surfaces thereon at the radially innermost and outermost extents of said pressure chamber.

2. A device for tensioning a bolt utilizing fluid pressure, comprising:
   a. a base;
   b. a bolt having a threaded end projecting from said base;
   c. a threaded nut carried outermost on the threaded end of the bolt for carrying the load;
   d. an annular piston having a threaded bore carried in threaded engagement with said threaded bolt and disposed between said base and said nut in axially spaced relation to said nut;
   e. an annular cylinder angularly keyed to and slidably receiving and surrounding said piston and defining an annular pressure chamber therewith, said cylinder having end surfaces disposed between and engaging said base and said nut, and being of such transverse dimension that said nut can be tightened to act axially through said cylinder against said base, and being of a size in axial length greater than that of said piston, said entire piston being disposed between and axially spaced from said end surfaces, said cylinder having fluid inlet means and including a duct extending between said fluid inlet means and said pressure chamber, said piston and said cylinder having sealing means acting between mating surfaces thereon;
   f. said nut having an end surface overlying and spaced from said piston and corresponding in size to the adjacent end surface of said cylinder;
   whereby the assembly of said piston and cylinder are disposed as a unit between said base and said nut in threaded relation to said bolt, and left in said position after the bolt has been tensioned.

3. A device according to claim 2 in which at least one of the piston and cylinder surfaces which are slidably engageable with each other is convex, whereby compensation is provided for any angular misalignment.

* * * * *